United States Patent [19]

Kuntz

[11] 4,048,425

[45] Sept. 13, 1977

[54] ALTERNATING ELASTOMERIC INTERPOLYMERS

[75] Inventor: Irving Kuntz, Linden, N.J.

[73] Assignee: Exxon Research and Engineering Company, Linden, N.J.

[21] Appl. No.: 650,974

[22] Filed: Jan. 21, 1976

Related U.S. Application Data

[63] Continuation-in-part of Ser. No. 459,865, April 11, 1974, abandoned.

[51] Int. Cl.$^2$ .......................................... C08F 220/12
[52] U.S. Cl. ............................ 526/245; 260/33.6 AQ; 260/79.5 C; 260/33.8 UA; 260/79.5 P; 260/836; 260/888; 260/889; 260/897 C; 526/16; 526/30; 526/184; 526/189; 526/282; 526/292; 526/293
[58] Field of Search ................................ 526/245, 293

[56] References Cited

U.S. PATENT DOCUMENTS

| | | | |
|---|---|---|---|
| 3,752,788 | 8/1973 | Hiroota et al. | 260/47 UA |
| 3,763,119 | 10/1973 | De Marco et al. | 260/80.76 |
| 3,814,734 | 6/1974 | Kawasumi et al. | 260/63 R |

*Primary Examiner*—Stanford M. Levin
*Attorney, Agent, or Firm*—H. E. Naylor

[57] ABSTRACT

Alternating elastomeric interpolymers comprised of: (A) about 50 mol percent of one or more acyclic or alicyclic esters of acrylic acid wherein the ester radical moiety is free of olefinic unsaturation or readily replaceable halogen; (B) one or more of acyclic or alicyclic Type I or Type III mono-olefins; and (C) 0.3 to 30 mol percent of one or more halomethylated aromatic vinyl compounds, the sum of the (B) and (C) components totalling about 50 mol percent of the interpolymer. The interpolymers can be readily substituted or crosslinked with nucleophilic reagents at moderate temperatures. The crosslinked elastomers possess good tensile strength, elongation and modulus and have utility as general purpose, or particularly as oil and heat resistant elastomers.

1 Claim, No Drawings

ALTERNATING ELASTOMERIC INTERPOLYMERS

REFERENCE TO RELATED APPLICATIONS

This application is a continuation-in-part application of Ser. No. 459,865, filed Apr. 11, 1974 now abandoned.

BACKGROUND OF THE INVENTION

A. Field of the Invention

This invention relates to crosslinkable elastomeric interpolymers comprising a major proportion of one or more olefins and one or more esters of acrylic acid and a minor proportion of a vinyl aromatic compound having a halomethyl group substituted for one of the aromatic ring hydrogens.

More particularly, this invention relates to interpolymers, having elastomeric properties when crosslinked by means of nucleophilic reagents, said interpolymers prepared with the aid of a catalyst system comprising a Lewis acid and a free-radical generator from monomers comprising one or more acyclic or alicyclic olefins; one or more acyclic or alicyclic esters of acrylic acid wherein the acyclic or alicyclic radical moiety is free of olefinic unsaturation or readily replaceable halogen; and from 0.3 to 30 mol percent of the total monomers present in said interpolymer of a halomethylated aromatic vinyl compound.

Most particularly, this invention relates to interpolymers, having elastomeric properties when cross-linked by means of one or more nucleophilic reagents, prepared with the aid of a catalyst system comprising a Lewis acid and an organic peroxide comprising (A) about 50 mol percent of one or more $C_1$ to $C_{20}$ acyclic or alicyclic esters of acrylic acid in which the $C_1$ to $C_{20}$ acyclic or alicyclic ester radical moiety is free of olefinic unsaturation or readily replaceable halogen; and a total of about 50 mol percent of the sum of: (B) one or more $C_2$ to $C_{20}$ acyclic or alicyclic Type I (R—CH=CH$_2$) or Type III (R(R')C=CH$_2$) monoolefins wherein R and R' are independently selected from the group consisting of hydrogen, and $C_1$ to $C_{18}$ straight and branched chain alkyl radicals, aryl, alkylaryl, arylalkyl and cycloalkyl radicals; and (C) 0.3 to 30 mol percent, preferably not more than 10 mol percent (in the total interpolymer) of one or more halomethylated aromatic vinyl compounds.

While the preferred method for the preparation of the interpolymers of this invention is from the said monomers, an alternative method comprises polymerizing (A) one or more $C_1$ to $C_{20}$ acyclic or alicyclic esters of acrylic acid in which the $C_1$ to $C_{20}$ ester radical moiety is free of olefinic unsaturation or readily replaceable halogen; (B) one or more $C_2$ to $C_{20}$ acyclic or alicyclic Type I or Type III monoolefins; 0.3 to 30 mol percent of an aromatic vinyl compound, followed by halomethylation of the aromatic ring in the interpolymer.

The interpolymers of this invention may be blended, prior to crosslinking, with halogenated polymers such as halogenated polyolefins; halogenated butyl rubber; halogenated terpolymers such as the brominated EPDM described in U.S. Pat. No. 3,524,826; sulfochlorinated polyolefin elastomers such as hypalon; polychloroprenes such as neoprene; polyvinyl chloride; epichlorohydrin rubbers. Such blends may also include process oils, plasticizers, resins, fillers and reinforcing agents. The crosslinked elastomers of this invention possess a high tensile strength, elongation and modulus and are useful as general or special purpose elastomers.

The highly reactive nature of the halogen in a halomethyl group attached to an aromatic ring not only facilitates crosslinking at moderate vulcanization temperatures but provides a means for conversion of the halomethyl moiety to a variety of derivatives having increased utility. Generally, the use of a difunctional nucleophilic reagent leads to crosslinking, while a monofunctional nucleophilic reagent gives substituted derivatives. Particularly useful as difunctional reagents are diamines, and their derivatives, and ureas, thioureas, and their mono- and dialkylated reaction products. For example, reaction of the interpolymers of this invention with reagents well known to those having ordinary skill in the chemical arts permits conversion of the halomethyl group to a cyanomethyl group; hydroxymethyl group; carboxymethyl group; aldehyde group; thiomethyl group; aminomethyl group; alkoxymethyl group; methylene ester of a carboxylic acid; quaternary nitrogen halides and the like. It is possible by suitable adjustment of the ratio of the polymer and the difunctional nucelophilic reagent to obtain substituted polymer derivatives rather than crosslinked products. Derivatives containing residual halomethyl groups may be further reacted, with for example, difunctional reagents to give crosslinked networks. And the substituted products, for example, the hydroxymethyl and aminomethyl derivatives may be crosslinked with a dibasic acid or anhydride, or by reaction of the carboxylic acid derivative with a glycol. The utility of the interpolymers of this invention is very broad as is evident from this discussion.

B. Prior Art

Copolymers of alkyl acrylates with chlorine containing monomers are old in the art. For example, copolymers of ethyl acrylate with from 2.5 to 5 percent of 2-chloroethyl acrylate or 2-chloroethyl vinyl ether have been available commercially as Lactoprene EV since 1944.

Similar copolymers of alkyl acrylates with vinyl chloroacetates are disclosed in U.S. Pat. No. 3,201,373.

U.S. Pat. No. 3,578,636 discloses alternating interpolymers of an olefin or halogenated olefin with an acrylate ester or halogenated ester of acrylic acid.

U.S. Pat. No. 3,629,215 discloses alternating interpolymers of alpha-olefins, halo-olefins and alpha or beta substituted acrylic compounds.

U.S. Pat. No. 3,635,924 describes the preparation of copolymers from halo-olefins and acrylic compounds.

Belgian Pat. No. 763,733 discloses interpolymers of an olefin, a saturated or unsaturated alkyl acrylate and a halogenated ester or ether such as 2-chloroethyl acrylate or 2-chloroethyl vinyl ether.

Netherlands Pat. No. 7,204,702 discloses copolymers of ethylene with vinyl chloride, vinyl chloroacetate and 2-chloroethyl acrylate.

SUMMARY

In distinction to the products and processes of the prior art, it has now been found that interpolymers which have elastomeric properties when crosslinked by means of nucleophilic reagents may be prepared from monomers which comprise (A) one or more $C_1$ to $C_{20}$ acyclic or alicyclic esters of acrylic acid wherein the ester radical moiety is free of olefinic unsaturation or halogen which will react with nucleophilic reagents under the conditions normally used for the vulcanization of elastomeric composition referred herein as "readily replaceable halogen;" (B) one or more $C_2$ to $C_{20}$ acyclic or alicyclic Type I or Type III monoolefins; and (C) one or more halomethylated aromatic vinyl compounds by means of a catalyst system comprising a Lewis acid and an organic peroxide or other reagent which is generally used as a generator of free radicals.

The interpolymer contains about 50 mol percent of the acrylic ester and a total of about 50 mol percent of the olefin and chloromethylated aromatic vinyl compound with the limitation that the halomethylated aromatic vinyl compound does not exceed more than 30 mol percent, preferably not more than 10 mol percent, of the monomers present in the interpolymers.

The properties of the interpolymer suggest a microstructure for the polymer chain in which acrylate ester monomer units alternate with either an olefin monomer unit or a randomly distributed halomethylated aromatic vinyl monomer unit. According to this structure a segment of the interpolymers of this invention may be illustrated as follows:

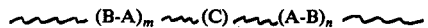

wherein $m$ and $n$ are integers which cannot be determined with any major degree of accuracy with the analytical methods available at the present time, but for any particular macromolecule of the instant invention may be in the range of 1 to about 500.

For the specific case where the acrylate ester (A) is ethyl acrylate; the olefin (B) is isobutylene; and the halomethylated aromatic vinyl compound (C) is 4-chloromethyl styrene, a segment of the interpolymer macromolecule of this invention may be illustrated as follows:

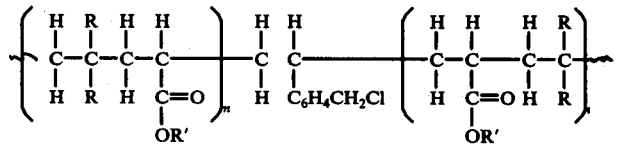

where R is a methyl radical, R' is an ethyl radical and $m$ and $n$ are as indicated above.

DESCRIPTION OF PREFERRED EMBODIMENTS

I. Monomers  A. Acrylic Esters $C_1$ to $C_{20}$ acyclic or alicyclic esters of acrylic acid in which the ester radical moiety is free of olefinic unsaturation or readily replaceable halogen may be illustrated by the general formula $CH_2=CH\text{-}COOR$ wherein R is selected from the group consisting of straight or branched chain alkyl radicals, arylalkyl radicals, cycloalkylalkylene radicals, and perfluoroalkyl radicals. Non-limiting examples are: methyl; ethyl; n-propyl; n-butyl; isobutyl; n-amyl; n-hexyl; 2-ethylhexyl; n-octyl; isooctyl, derived by the oxonation of mixed heptenes followed by hydrogenation; isodecyl; 3,5,5-trimethylhexyl; n-dodecyl; tridecyl; tetradecyl; heptadecyl; cyclohexyl; octadecyl; benzyl; hexahydrobenzyl; and perfluoro butyl radicals.

B. Olefins

Monoolefins suitable for the practice of this invention include $C_2$ to $C_{20}$ hydrocarbons which may be Type I olefins having the general formula $R\text{—}CH=CH_2$ and Type III olefins having the general formula $R(R')C=CH_2$ wherein R and R' are independently selected from the group consisting of hydrogen; straight and branched-chain alkyl radicals; aryl; alkylaryl; arylalkyl and cycloalkyl radicals having from 1 to 18 carbon atoms.

Non-limiting examples of suitable Type I olefins include: ethylene; propylene; 1-butene; 1-pentene; 1-hexene; 4-methyl-1-pentene; 1-heptene; 4,4-dimethyl-1-pentene; 1-octene; 1-nonene; 1-decene; 3,7-dimethyl-1-octene; 1-dodecene; 1-tridecene; 1-tetradecene; 1-octadecene; styrene; 4-methyl styrene; vinyl cyclopentane; vinyl cyclohexane; 2-vinyl norbornene; α-vinyl naphthalene; 5,5,7,7-tetramethyl-1-octene; and 3,6,10-trimethyl-1-hendecene.

Non-limiting examples of suitable Type III olefins include: isobutylene; 2,3-dimethyl-1-butene; 2,4,4-trimethyl-1-pentene; 2,6-dimethyl-1-octene; 4-isopropenyl toluene; isopropenyl cyclopentane; α-methyl styrene; 1-isopropenyl naphthalene; 2,5,9-trimethyl-1-decene; 2,6,10-trimethyl-1-hendecene; and 2,7,11-trimethyl-1-dodecene.

The general formulae used to illustrate the types of olefins suitable for the practice of this invention are based on the Boord Classification described by Schmidt and Boord in J.A.C.S. 54, 751 (1932).

C. Halomethyl Aromatic Vinyl Compounds $C_9$ to $C_{18}$ halomethyl aromatic vinyl compounds useful in the practice of this invention may be illustrated by the general formula $CH_2=CH\text{—}R\text{—}CH_2X$ wherein R is an arylene radical having from 1 to 3 rings and X is a halogen independently selected from the group consisting of chlorine, bromine and iodine. Non-limiting examples include: 3-chloromethyl styrene; 4-chloromethyl styrene; 1-vinyl-4-chloromethyl naphthalene; 4-chloromethyl-2,3,5,6-tetramethyl styrene; 4-bromomethyl styrene; 3-chloromethyl-4-methyl styrene; 3-methoxy-4-chloromethyl styrene. Of particular utility is a commercially available chloromethylated styrene herein referred to as VBC (vinyl benzyl chloride) which is a mixture of approximately 60 wt. percent of the meta isomer and 40 wt. percent of the para isomer.

II. Catalysts

Catalyst compositions suitable for the practice of this invention comprise, in combination, a Lewis acid and a reagent generally used as a generator of free-radicals. However, according to the process of this invention these free radical generators are used at temperatures very much lower than those commonly employed. The chemical mechanism of this polymerization is not known and the intermediary of free radical species is not implied. Preferred Lewis acids are metal halides and alkylaluminum halides and preferred generally recognized sources of free-radicals are organic peroxy compounds and azo compounds. In addition to the Lewis acid reagent and peroxy compound, cocatalysts particularly vanadium compounds may optionally be used to enhance and direct the activity of the catalyst system. In no case should the Lewis acid be pre-reacted with the halomethyl aromatic vinyl compound since doing so leads to side reactions which interfere with the proper incorporation of the monomer in the interpolymer product.

Non-limiting examples of Lewis acids which are suitable for the practice of this invention include: Aluminum trichloride, aluminum tribromide, aluminum triiodide, hydrofluoric acid, boron trichloride, boron trifluoride, ferric chloride, stannic chloride, zinc chloride, zirconium tetrachloride, and organoaluminum halides having the general formula $AlR_mX_n$ wherein R is a monovalent hydrocarbon radical selected from the group consisting of $C_1$ to $C_{12}$ alkyl, aryl, alkylaryl, arylalkyl and cycloalkyl radicals, m is a number from 1 to 3, X is a halogen selected from the group consisting of chlorine, bromine and iodine, and the sum of m and n is 3. Preferred are ethyl aluminum sesquichloride, $Et_{1.5}AlCl_{1.5}$ and ethyl aluminum dichloride, $EtAlCl_2$.

Useful cocatalyst vanadium compounds have the general formula $VO_zX_t$ wherein z has a value of 0 or 1, t has a value of two to four, and X is independently selected from the group consisting of chlorine, bromine, iodine, acetylacetonates, haloacetylacetonates, alkoxides and haloalkoxides. Non-limiting examples include $VCl_4$, $VOCl_3$, $VO(OEt)_3$, $VOCl_2(OBu)$, $V(AcAc)_3$, $VO(AcAc)_2$, and $VOCl_2(AcAc)$ where (AcAc) represents the acetylacetonate moiety.

While the generally recognized free-radical generators such as ultraviolet light and high-energy radiation may be used in the catalyst system of this invention, preferred are organic peroxides, hydroperoxides, peracids, peroxyesters and azo compounds. Non-limiting examples include benzoyl peroxide; acetyl peroxide, lauroyl peroxide; t-butyl peroxide; t-butyl peracetate; t-butyl peroxypivalate; cumene hydroperoxide; 2-methyl pentanoyl peroxide, dicumylperoxide and 2,2'-azo bis(isobutyronitrile).

The concentration of the individual catalyst components may be varied over a wide range depending on the reactivity of the individual monomers. Suitable mol ratios of acrylate ester to organoaluminum halide, for example, may range from 1 to 2000 mols of acrylate ester per mol of organoaluminum halide, or higher. Preferred is a ratio of 5 to 1500 mols of acrylate ester per mol of organoaluminum halide. Most preferred is a ratio of from about 10 to 1000 mols of acrylate ester per mol of organoaluminum halide.

The peroxide component is similarly variable over a wide range of mol ratios. Suitable ratios range from 10 to 2000 mols of acrylate ester per mol of peroxide or azo compound. Preferred is a ratio of from about 20 to 1000. Most preferred is a ratio of from 30 to about 500 mols of acrylate ester per mol of the free radical generator.

As indicated above, a vanadium cocatalyst may optionally be used to enhance the activity and selectivity of the principal catalyst system. When used, the vanadium compound may be added to the catalyst system in the range of from 1 to about 100 mols of organoaluminum halide per mol of vanadium compound. Preferred is a range of from 2 to 50. Most preferred is a molar ratio of from about 3 to 30 mols of organoaluminum halide per mol of vanadium compound.

III. Solvents

Suitable media for dissolving or dispersing the monomers, catalyst components and polymeric reaction products include the general group of aliphatic and aromatic petroleum hydrocarbons and halogenated hydrocarbons. Acyclic or alicyclic $C_8$ or lower straight or branched chain saturated hydrocarbons and aromatic hydrocarbons are preferred. $C_1$ to $C_8$ halogenated hydrocarbons are also useful solvents. Choice of a particular solvent or mixture of solvents will depend on the process conditions, e.g. whether a homogeneous solution process, a suspension or slurry process, or cement suspension process is used.

In a homogeneous solution process for the production of high-molecular weight polymers, the concentration of polymer in the cement is usually limited to the range of 5 to 10 weight percent since higher concentrations require excessive power input to insure good mixing, efficient heatexchange is difficult to achieve and the high viscosity of the solution at the temperatures which are usually employed during the polymerization reaction causes sticking and fouling of the reactor with the reaction products.

In a slurry process in which the monomers and catalyst components are soluble in the solvent, but in which the polymer is not, higher concentrations of dispersed polymer in the range of 10 to 20 wt. percent may be attained. In the slurry polymerization process dispersion or slurry aids are often used to produce stable, non-sticky polymer slurries. Similar concentrations may be handled in reactors equipped with conventional mixers in a cement-suspension process in which a single or mixture of solvents is chosen which yields two phases; a dispersed cement phase of polymer swollen with monomers and solvent and a continuous phase consisting essentially of the pure solvent containing a small amount of monomers. Any of the above solvent systems may be used in batch, semi-continuous or fully continuous processes.

Non-limiting examples of suitable solvents which may be used alone or in admixture include: butane; pentane; cyclopentane; hexane; heptane; isooctane; benzene; cyclohexane; toluene; methyl cyclohexane; xylenes; cumene; methyl chloride; methylene chloride; dichloroethane; orthodichlorobenzene and fluorinated or chlorfluorinated $C_2$ to $C_4$ acyclic hydrocarbons. Solvents which are known to form stable complexes or coordination compounds with any of the catalyst components, particularly the Lewis acid, or vanadium compound if used as a cocatalyst, are undesirable and should be avoided.

IV. Process Conditions

The interpolymers of this invention may be prepared in batch, semi-continuous or fully continuous processes in which homogeneous solution, slurry or cement-suspension solvent systems are utilized. In a typical batch process, a reactor fitted with efficient agitation means, and means for cooling the reaction mixture and withdrawing the heat of reaction is purged of air by displacement with oxygen-free nitrogen, argon or low-boiling olefin-free hydrocarbon vapors such as methane, ethane or propane and charged with dry solvent or a mixture of solvents.

Monomers and catalyst components in all processes, pre-diluted with solvent if desired may then be introduced into the stirred reactor, either simultaneously or sequentially, at a rate consistent with the means used for heat-exchange to maintain the desired temperature range. Pressure on the reactor is maintained at a level sufficient to keep the reactants in the liquid phase. The catalyst components may be mixed in line in the absence of monomers before they are added to the reactor, or they may be added directly to the reactor in the presence of the monomers. In the process of this invention it should be noted that reactor feed systems should be arranged so that the alkyl aluminum halide does not contact the halomethyl aromatic vinyl compound in the absence of the other reagents. That is, the halomethyl aromatic vinyl compound is mixed with the other monomers before the alkyl aluminum halide is introduced. This feature is an important aspect of the instant invention.

Temperatures at which polymerization may be conducted may range from $-100°$ C. to $100°$ C. Preferred are temperatures in the range of $-80°$ C. to $50°$ C. Most preferred are temperatures in the range of $-40°$ C. to $40°$ C. The temperature may be varied during the time required for optimum yield and polymer properties, with for example a low temperature during the initial phase of the reaction and a higher temperature during the final phase.

Reaction time may vary widely, depending on the reactivity of the particular monomers, the catalyst concentration and temperature of the reaction. Generally, reaction times are shorter at higher monomer, organoaluminum and peroxide concentrations and at higher polymerization temperatures. Accordingly, polymerization times may vary from as little as two minutes to 200 hours. Preferred are reaction times in the range of from 10 minutes to 24 hours. Most preferred are reaction times in the range of 15 minutes to 10 hours.

Isolation of the interpolymer at the completion of the reaction may be accomplished in a variety of ways. In a preferred embodiment, the homogeneous polymer cement solution, or polymer suspension, or polymer cement suspension is fed from the reactor in the case of a batch process, or the final reactor or holding drum in the case of a semi-continuous or fully continuous process to a mixing drum where the reaction mixture has been mixed either in line or is mixed in the drum with a quantity of a lower alcohol such as methanol, ethanol or isopropanol in order to inactivate the catalyst mixture. The alcohol may optionally contain low levels of water or a sequestering reagent such as ethylene diamine tetraacetic acid or its disodium salt or acetylacetone. While inactivation of the catalyst in the manner indicated is preferred, it is not essential and may be omitted is desired.

The polymer solution or suspension, with or without catalyst inactivation is fed to an agitated wash drum where it is mixed with water or a dilute aqueous solution of an acid such as hydrochloric or sulfuric acid in order to deash the polymer. Acid treatment followed by thorough water washing under efficient agitation is repeated if necessary so as to obtain a polymer with a minimal ash content.

Final isolation of the polymer in crumb form is accomplished by feeding the polymer solution or suspension to a slurry flash drum where it is treated with steam and hot water to precipitate the polymer and vaporize the solvent. Typically, antioxidants, stabilizers and slurry aids are added to the polymer solution or suspension before or during the slurrying/solvent removal operation. The water slurry of polymer is finally fed to dewatering and drying extruders before packaging in bale, pellet or crumb form. Solvents and unreacted monomers, vaporized in the slurry flash drums are generally recycled to the polymerization reactors.

V. Crosslinking Reagents

Generally, the same nucleophilic reagents which are used for crosslinking and vulcanizing halogenated hydrocarbon elastomers, such as chlorinated or brominated butyl rubber, in which the halogen is in an allylic relationship to a double bond may be used for crosslinking the interpolymers of this invention. Preferred are nucleophilic compounds containing nitrogen or sulfur or both, a comprehensive list of which may be found in "Materials and Compounding Ingredients For Rubber and Plastics," published annually by Rubber World, New York, N.Y.

Non-limiting examples include: diamines, diamine carbamates, ethylene imine derived polyamines, alkylated thioureas particularly the N,N'-dialkylthioureas, 2-mercaptoimidazoline, catechol salts, for example, dicatechol borates and polymethylolalkylphenol resins and their halogenated derivatives.

While the above disclosure is deemed to be adequate for those having ordinary skill in the art to prepare and crosslink the elastomeric interpolymers of this invention, the following examples more clearly demonstrate the advance over the prior art.

VI. Experimental

EXAMPLE 1 — Preparation of an interpolymer of ethyl acrylate, isobutylene and chloromethyl styrene The polymerization was carried out in a pressure vessel fabricated from a solid cylinder of polypropylene plastic which had been bored to create a cylindrical cavity of 800 ml. The vessel was sealed by means of a threaded cap and an oil-resistant O-ring fashioned from an acrylonitrile rubber.

The polymerization vessel, contained in a dry-box from which air and moisture were excluded by means of a positive internal pressure of oxygen-free and moisture-free nitrogen, was charged with 200 ml. of toluene which had been purified by percolation through a column of Linde 3A molecular sieves, 50 grams (0.5 mol) of a commercial grade of ethyl acrylate containing 15 ppm of 4-methoxyphenol as an antioxidant and 15.3 grams (0.1 mol) of a commercial grade of chloromethyl styrene having an isomer distribution of about 60 percent of the meta isomer and about 40 percent of the para isomer, hereinafter designated VBC (commercially sold as vinyl benzyl chloride).

The pressure vessel was then immersed in a Freon 11 (trichlorofluoromethane) bath maintained at $-20°$ C. located in the dry box, and the vessel and contents cooled to $-15°$ C. There was then added to the vessel in succession 7.5 ml. of a 1.0 molar solution of ethyl aluminum sesquichloride ($Et_{1.5}AlCl_{1.5}$) in purified n-heptane, 56 grams (1.0 mol) of liquefied isobutylene and 1 millimol of lauroyl peroxide dissolved in 20 ml. of purified toluene. The reaction vessel was sealed, removed from the Freon bath and allowed to come to room temperature which required about 1 hour.

The reaction vessel was then placed in a tumbling water bath maintained at $32°$ C. and tumbled for a period of 40 hours. The pressure vessel contents were then transferred to a flask and the reaction terminated by the addition of 15 ml. of isopropyl alcohol and 10 ml of methanol.

The elastomeric product was isolated by addition of the solution to a boiling water bath whereby the product precipitated as a slurry. The product was filtered from the water and dried in a vacuum oven for 4 hours at $60°$ C. at a pressure of 20 torr. The yield of polymer was 20.4 grams. It had an inherent viscosity of 0.52 in benzene solution at 0.1 g/dl at $25°$ C.

A sample of the polymeric product dissolved in $CCl_4$ was examined by NMR at 60 MHz. The structure of the interpolymer was determined by using the chemical shifts at 7.0 ppm (relative to tetramethyl silane) as a measure of aromatic protons, the chemical shift at 4.5 ppm for the —$CH_2Cl$ group and the —$OCH_2$—signal at 3.95 ppm for the ester. From the analysis the structure of the interpolymer was determined as containing the following monomer units: 52 mol percent of ethyl acrylate; 23 mol percent of isobutylene and 25 mol percent of chloromethyl styrene. The sum of the molar units derived from isobutylene and chloromethyl styrene is 48%, and within the precision of the NMR analysis is equal to that of the ethyl acrylate (52 mol %). The polymer was analyzed for C, H and Cl. Calculated for $Isb_{0.23}EtAc_{0.52}VBC_{0.25}$: C, 67.2; H, 8.1; Cl, 8.6. Found: C, 66.6; H, 7.7; Cl, 9.0.

In the following two examples, experiments were carried out to determine whether prereacting the alkylaluminum halide with the chloromethyl aromatic vinyl compound was desirable.

EXAMPLE 2

The preparation and isolation of the interpolymer was the same as was used in Example 1 except that 5.05 grams (0.033 mol) of VBC was used instead of 0.1 mol. The isolated product had an inherent viscosity in benzene at 25° C. and a concentration of 0.1 g/dl of 0.76 and on analysis by NMR showed monomer residues of 50 mol percent of ethyl acrylate; 41 mol percent of isobutylene; and 9.0 mol percent of VBC. Calculated for: $Isb_{0.41} EtAc_{0.52} VBC_{0.09}$; C, 68.5; H, 9.5; Cl, 3.7. Found: C, 68.1; H, 9.5; Cl, 4.2.

EXAMPLE 3

The preparation and isolation of the interpolymer was in general the same as Example 2 except that the VBC, dissolved in 100 ml. of toluene was contacted at −20° C. with the ethylaluminum sesquichloride solution and then added to a toluene solution of the ethyl acrylate. The yield of polymer was 4.1 grams and on elemental analysis contained only 0.16 weight percent of chlorine and when examined by NMR did not show the chemical shift associated with the —$CH_2Cl$ group. This result in comparison with that of Example 2 shows that prereacting the alkylaluminum halide with the chloromethyl aromatic compound is to be avoided, since it appears to lead to undesirable side reactions.

EXAMPLES 4 to 7

A series of experiments were made in the same manner as Example 1, in which the molar proportions of VBC and catalyst were varied. The quantities used and the results obtained are given in Table I.

TABLE I

| INTERPOLYMERS OF ETHYL ACRYLATE, ISOBUTYLENE AND VBC[a] | | | | |
|---|---|---|---|---|
| Example No. | 4 | 5 | 6 | 7 |
| VBC, mmols. | 18 | 18 | 33 | 7 |
| $Et_{1.5}AlCl_{1.5}$, mmols | 7.5 | 15 | 15 | 15 |
| Reaction time, Hrs.[b] | 89 | 89 | 89 | 89 |
| Polymer yield, gms. | 74 | 79 | 77 | 77 |
| Inherent Viscosity[c] | 0.73 | 0.90 | 0.80 | 0.86 |

Notes:
[a]All runs were made with 200 ml of toluene, 0.5 mol of ethyl acrylate, 1.0 mol of isobutylene and 1 mmol of lauroyl peroxide.
[b]All runs made at 32° C.
[c]In benzene at a concentration of 0.1 g/dl Sample 6 was examined by NMR and analyzed for C, H and Cl. NMR analysis showed monomer residues in the product of 49 mol percent of ethyl acrylate; 47 mol percent of isobutylene; and 4 mol percent of the chloromethyl styrene. Calculated for: $Isb_{0.47} EtAc_{0.49} VBC_{0.04}$; C 69.1; H,9.9; Cl,1.7. Found: C, 68.9; H, 9.9; Cl, 1.9.

Samples 4, 5 and 7 had on analysis a chlorine content of 1.0, 1.3 and 1.0 weight percent, respectively.

EXAMPLE 8

The interpolymer of Example 6 was compared, with respect to rate of cure, with a sample of an interpolymer of ethyl acrylate, isobutylene and 2-chloroethyl vinyl ether prepared according to the teachings of the Belgian Pat. No. 763,333 referred to above. Both samples had essentially the same chlorine content and were formulated on a rubber mill in the same recipe. The recipe used was: interpolymer 100, zinc oxide 5, N,N'dibutylthiourea 4. Samples were cured at 320° F. for 30 minutes in a press at a pressure of 1,200 psi and samples cut from the molded pads were tested on the Instron machine at a strain rate of 20 inches per minute.

The product of Example 6 showed a tensile strength of 2,665 psi, an elongation at break of 225% and a modulus at 100% extension of 950 psi. The product made with 2-chloroethyl vinyl ether showed a tensile of only 570 psi and an elongation of 700%.

While the preferred embodiments of this invention are elastomers, it is possible by a suitable selection of components and their ratios to produce thermoplastic and thermoset compositions. Also possible is the production of lower molecular weight materials particularly useful as oil additives.

Having described the invention and preferred embodiments thereof what is claimed is:

1. An alternating cross-linkable elastomeric interpolymer which comprises:

A. about 50 mol percent of one or more $C_1$-$C_{20}$ acyclic or alicyclic esters of acrylic acid wherein the ester radical moiety is free of olefinic unsaturation and is selected from the group consisting of straight and branched-chain alkyl radicals, arylalkyl radicals, cycloalkyl-alkylene radicals and perfluoroalkyl radicals; and a total of about 50 mol percent of:

B. one or more $C_2$-$C_{20}$ acyclic or alicyclic monoolefins having the general formulae R—CH=$CH_2$ or R(R')C=$CH_2$ wherein R and R' are independently selected from the group consisting of hydrogen, straight and branched-chain alkyl radicals, arylalkyl and cycloalkyl radicals; and C. 0.3 to 30 mol percent of the total monomers present of vinyl benzyl chloride; wherein the microstructure of said crosslinkable elastomeric interpolymers is such that monomer units represented by (A) above alternate with either a monomer unit represented by (B) above or a randomly distributed monomer unit represented by (C) above and can be represented schematically by the formula

wherein m and n are integers on the range of 1 to about 500.

* * * * *